United States Patent
Wrathall

(10) Patent No.: US 8,542,503 B2
(45) Date of Patent: Sep. 24, 2013

(54) SYSTEMS AND METHODS FOR HIGH SPEED POWER FACTOR CORRECTION

(76) Inventor: Robert Stephen Wrathall, Scotts Valley, CA (US)

( * ) Notice: Subject to any disclaimer, the term of this patent is extended or adjusted under 35 U.S.C. 154(b) by 390 days.

(21) Appl. No.: 13/018,329

(22) Filed: Jan. 31, 2011

(65) Prior Publication Data

US 2012/0195082 A1    Aug. 2, 2012

(51) Int. Cl.
*H02M 1/12*    (2006.01)

(52) U.S. Cl.
USPC ............................................... 363/39; 363/46

(58) Field of Classification Search
USPC ......... 363/35, 39, 46, 51; 323/222, 282–285, 323/351
See application file for complete search history.

(56) References Cited

U.S. PATENT DOCUMENTS

| | | | |
|---|---|---|---|
| 3,824,446 A | 7/1974 | Forster | |
| 4,104,576 A * | 8/1978 | Frank | 323/210 |
| 4,774,454 A | 9/1988 | Yamaguchi | |
| 5,377,092 A * | 12/1994 | Rowand et al. | 363/41 |
| 5,557,560 A | 9/1996 | Dix | |
| 5,561,595 A | 10/1996 | Smith | |
| 5,751,138 A | 5/1998 | Venkata | |
| 6,344,986 B1 | 2/2002 | Jain | |
| 6,465,990 B2 | 10/2002 | Acatrinei | |
| 6,608,770 B2 | 8/2003 | Vinciarelli | |
| 6,657,417 B1 | 12/2003 | Hwang | |
| 7,057,907 B2 | 6/2006 | Oh | |
| 7,084,369 B2 | 8/2006 | Sosnowski | |
| 7,148,664 B2 | 12/2006 | Takahashi | |
| 7,274,579 B2 | 9/2007 | Ueda | |
| 7,525,821 B2 * | 4/2009 | Hansson et al. | 363/16 |
| 7,719,862 B2 * | 5/2010 | Wrathall | 363/45 |
| 7,759,910 B2 * | 7/2010 | Lindahl et al. | 323/207 |
| 2005/0212501 A1 | 9/2005 | Acatrinei | |
| 2005/0270814 A1 | 12/2005 | Oh | |
| 2007/0236963 A1 | 10/2007 | Yasumura | |

OTHER PUBLICATIONS

Erickson et al. "Fundamentals of Power Electronics." 2nd ed., Springer Science + Business Media, 2001. pp. 143-145.
"Power Factor Correction Handbook." HBD853/D, Rev. 2, On Semiconductor, Aug. 2004, pp. 5-17, 73-79, and 91-95.

* cited by examiner

*Primary Examiner* — Jessica Han
(74) *Attorney, Agent, or Firm* — Carr & Ferrell LLP

(57) ABSTRACT

Systems and methods described herein provide for high speed power factor correction which can overcome or substantially alleviate the problems associated with changes in the operating conditions of a load or other transient events. The present technology senses the present state conditions of a signal to quickly and accurately determine the presence of an overtone component within the signal. The expected value of the overtone component is then determined based on the sensed state of the signal. Power factor correction is then performed to suppress the overtone utilizing a control signal formed based on the expected value of the overtone. By performing power factor correction based on the expected value, the present technology can provide high speed power factor correction which is not limited by the delay introduced by an adaptive feedback loop.

12 Claims, 14 Drawing Sheets

SYSTEMS AND METHODS FOR HIGH SPEED POWER FACTOR CORRECTION

BACKGROUND

1. Field of the Invention

The present invention relates generally to power factor correction. More particularly, the present invention concerns high speed power factor correction in devices such as regulated power supplies, and methods for operating such devices.

2. Description of Related Art

Electric power is often provided as alternating-current ("AC") power in the form of time-varying currents and voltages. Typically, the AC power is furnished by providing a supply voltage that varies over time at a fundamental supply frequency $f_{AC}$. In North America, for example, AC power is typically provided at a supply voltage having a fundamental supply frequency $f_{AC}$ of 60 Hertz. In European countries, the fundamental supply frequency $f_{AC}$ is typically 50 Hertz.

FIG. 1 illustrates a simplified diagram of a system 100 for supplying AC power to a remote load 120. The load 120 may for example be a computer, a television, a household appliance, or any other electronic device which requires power to operate.

A power supply source 110, which may be a generator at the location of a utility company, provides power by generating an AC supply voltage $V_{AC}(t)$ at a fundamental supply frequency $f_{AC}$ such as 60 Hertz. The supply voltage $V_{AC}(t)$ from the power supply source 110 is then distributed to the load 120 via a transmission line of a power distribution system 140. Although not illustrated in the simplified diagram of FIG. 1, the power distribution system 140 may include transformers and other components utilized in the distribution of power.

The supply voltage $V_{AC}(t)$ is delivered to the load 120 to induce a load current $I_{LD}(t)$ to flow between the power supply source 110 and the load 120 via the power distribution system 140, thereby delivering power to the load 120. The power generated by the power supply source 110 and distributed over the power distribution system 140 is the 'apparent power' delivered to the load 120. In comparison, the portion of the apparent power that, when averaged over time, results in a net transfer of energy into the load 120 is the 'actual power' consumed by the load 120. The actual power may for example be consumed by the load 120 by the conversion of the electrical energy into non-electrical energy such as heat, light or mechanical energy.

Ideally, all of the apparent power delivered to the load 120 is consumed as actual power, so that power which has been generated and distributed to load 120 is not wasted. However, typically the actual power is less than the apparent power. In other words, the power consumed by the load 120 is less than the power that must be generated and delivered to the load 120.

Power factor is defined as the ratio of the actual power to the apparent power, and is a dimensionless number between 0 and 1. The value of the power factor is thus a measure of the power consumption efficiency of the load 120. When all of the apparent power is consumed as actual power by the load 120, the power factor is 1. A lower power factor for the load 120 will require more apparent power, and thus draw more load current $I_{LD}(t)$, for the same actual power consumed. Although not utilized by the load 120, this higher apparent power in the form of higher load current $I_{LD}(t)$ still must be generated by the power supply source 110 and distributed over the power distribution system 140. As such, this higher apparent power is subject to losses in the power generation and distribution processes. This places a heavy stress on the power supply source 110 and the power distribution system 140, and may require more expensive generation and distribution equipment. It is therefore desirable for the power factor of the load 120 to be as close to 1 as possible.

The power factor of the load 120 is dependent on the time-varying relationship between the supply voltage $V_{AC}(t)$ and the load current $I_{LD}(t)$, which in turn depends on the electrical characteristics of the load 120. Ideally, the load 120 emulates the electrical characteristics of a resistor. In such a case, the supply voltage $V_{AC}(t)$ and the load current $I_{LD}(t)$ are directly proportional and change polarity at the same instant in each cycle of the waveform, as shown in FIG. 2A. As a result, power flows in a single direction from the power supply source 110 into the load 120 at each instance in time, such that all of the apparent power is consumed as actual power. This results in a power factor of 1 for the load 120.

Typically, however, the load 120 is not composed entirely of resistive elements. Instead, the load 120 may include components which can cause the power factor to be less than 1. These components may include reactive components such as capacitors or inductors which temporally store a portion of the apparent power as energy in electric and magnetic fields. Rather than being consumed as actual power, this stored energy can then be returned back to the power supply source 110 a fraction of a second after it is stored. In other words, these reactive components can result in power flowing both from the power supply source 110 to the load 120, and from the load 120 to the power supply source 110. This returned power is non-productive power which, although not consumed by the load 120, must still be generated by the power supply source 110 and distributed over the power distribution system 140. In such a case, the apparent power is greater than the actual power, resulting in a power factor less than 1.

Non-linear components within the load 120 which interrupt or otherwise distort the waveform of the load current $I_{LD}(t)$ can also cause the power factor to be less than 1. For example, the load 120 may consist of an electronic device such as a computer or household appliance which requires direct-current ("DC") power to operate. In such a case, a power supply circuit within the load 120 converts the AC power provided by the power supply source 110 into DC power. The power supply circuit typically converts the AC power into DC power using a rectifier circuit which includes diodes. The diodes in the rectifier circuit can result in the load 120 drawing a high load current $I_{LD}(t)$ only at the peaks of the supply voltage $V_{AC}(t)$, and drawing substantially zero load current $I_{LD}(t)$ at other instances in time. This results in the load current $I_{LD}(t)$ having a highly non-sinusoidal waveform as shown in FIG. 2B. The high peak currents in the load current $I_{LD}(t)$ result in significant power loss within the power distribution system 140 and place a heavy stress on the power supply source 110 and the power distribution system 140.

The distorted load current $I_{LD}(t)$ also results in the load current $I_{LD}(t)$ having higher frequency components at integer multiples of the fundamental supply frequency $f_{AC}$. For example, if the fundamental supply frequency $f_{AC}$ is 60 Hertz, the distorted load current $I_{LD}(t)$ can include components at 60 Hertz, 120 Hertz, 180 Hertz, 240 Hertz, etc.

The component of the load current $I_{LD}(t)$ at the frequency $f_{AC}$ is referred to herein as the fundamental component $I_{LD0}(t)$. A component of the load current $I_{LD}(t)$ at frequency $(m+1)f_{ac}$, where m is a positive integer greater than or equal to 1, is referred to herein as the mth overtone component $I_{LDm}(t)$. The load current $I_{LD}(t)$ is therefore a superposition of the fundamental and overtone components. This can be represented mathematically as:

$$I_{LD}(t) = I_{LD0}(t) + \sum_{m=1}^{M} I_{LDm}(t) \qquad \text{Eq. (1)}$$

where M is the total number of overtone components $I_{LDm}(t)$ within the load current $I_{LD}(t)$. The value $I_m$ at a given time to is the amplitude of the overtone component $I_{LDm}(t=t_0)$ at time $t=t_0$.

Although present within the load current $I_{LD}(t)$, the overtone components $I_{LDm}(t)$ are not consumed by the load 120 as actual power. In other words, the power within each of the overtone components $I_{LDm}(t)$ is non-productive power which, although not consumed by the load 120, must still be generated by the power supply source 110 and distributed over the power distribution system 140. As such, the presence of these overtone components $I_{LDm}(t)$ in the load current $I_{LD}(t)$ results in an apparent power greater than the actual power, thereby resulting in a power factor less than 1.

A power factor correction (PFC) circuit may be implemented within the load 120 to improve the power factor. The PFC circuit regulates the load current $I_{LD}(t)$ in an attempt to make the shape of the load current $I_{LD}(t)$ match the sinusoidal waveform of the supply voltage $V_{AC}(t)$. In doing so, the PFC circuit attempts to remove or suppress the overtone components $I_{LDm}(t)$ and obtain a power factor of 1.

The PFC circuit may control the shape of the load current $I_{LD}(t)$ via an adaptive feedback loop. The adaptive feedback loop is used to adjust the parameters of a control signal based on a measurement of the values of the overtone components present in the load current $I_{LD}(t)$. The control signal is then utilized to regulate the load current $I_{LD}(t)$ drawn by the load 120 such that the load current $I_{LD}(t)$ is directly proportional to, and in phase with, the supply voltage $V_{AC}(t)$. See, for example, U.S. Pat. No. 7,719,862, the disclosure of which is incorporated by reference herein.

An adaptive feedback loop can provide excellent steady-state power factor correction performance, thereby enabling efficient power consumption by the load 120 and reducing the stress on the power supply source 110 and the power distribution system 140. However, the transient response performance due to the delay introduced by the adaptive feedback loop continues to limit the overall power factor correction performance.

Transient events can occur in the system 100 when the electrical characteristics of the load 120 suddenly change. This can occur for example if the load 120 is turned on or off by a user. Transient events may also occur in the form of power supply source 110 glitches or surges. Due to the delay introduced into the power factor correction process by the adaptive feedback loop, the PFC circuit may not be able to adjust the load current $I_{LD}(t)$ quickly enough to maintain a power factor correction at or near 1. For example, due to the delay, the control signal not be adjusted until one-half cycle of the supply voltage $V_{AC}(t)$ or longer following a transient event. As a result, these transient events distort the load current $I_{LD}(t)$ and result in overtones components $I_{LDm}(t)$. This in turn causes the power factor of the load 120 to temporarily decrease, consequently decreasing the power consumption efficiency of the load 120 and increasing the stress on the power generation and distribution processes.

It is therefore desirable to provide systems and methods for high speed power factor correction that address the performance limitations associated with changes in the operating conditions of a load or other transient events.

SUMMARY OF THE INVENTION

Systems and methods described herein provide for high speed power factor correction which can overcome or substantially alleviate the problems associated with changes in the operating conditions of a load or other transient events. The present technology senses the present state of a signal to quickly and accurately determine the presence of an overtone component within the signal. Rather than measuring the actual value of the overtone component, an expected value of the overtone component is determined based on the sensed state of the signal. Power factor correction is then performed to suppress the overtone utilizing a control signal formed based on the expected value of the overtone. By performing power factor correction based on the expected value, the present technology can provide high speed power factor correction which is not limited by the delay introduced by an adaptive feedback loop.

A method for performing power factor correction on a signal having a fundamental supply frequency is described herein. The method includes sensing a state of the signal, the state indicating that the signal includes an overtone component of the fundamental supply frequency. An expected value of the overtone component is then retrieved from memory based on the sensed state of the signal. A control signal is then formed based on the expected value of the overtone component. The control signal is then applied to suppress the overtone component within the signal.

A circuit for performing power factor correction on a signal having a fundamental supply frequency is described herein. The circuit includes a memory storing an expected value of an overtone component of the fundamental supply frequency in the signal. The circuit also includes control circuitry to sense a state of the signal, where the sensed state indicates that the signal includes the overtone component. The control circuitry retrieves the expected value of the overtone component from memory based on the sensed state of the signal. The control circuitry then forms a control signal based on the expected value of the overtone component. The control circuitry then applies the control signal to suppress the overtone component in the signal.

Other aspects and advantages of the present invention can be seen on review of the drawings, the detailed description, and the claims which follow.

DETAILED DESCRIPTION

Systems and methods described herein provide for high speed power factor correction which can overcome or substantially alleviate the problems associated with changes in the operating conditions of a load or other transient events. The present technology senses the present state of a signal to quickly and accurately determine the presence of an overtone component within the signal. Rather than measuring the actual value of the overtone component, an expected value of the overtone component is determined based on the sensed state of the signal. Power factor correction is then performed to suppress the overtone utilizing a control signal formed based on the expected value of the overtone. By performing power factor correction based on the expected value, the present technology can provide high speed power factor correction which is not limited by the delay introduced by an adaptive feedback loop.

The expected value of the overtone component may be determined utilizing previously measured values of the overtone component in conditions similar to or identical to the sensed present state conditions of the signal. By determining the expected value based on previously measured values, the expected value can closely resemble or be identical to the actual value of the overtone component in the signal, without requiring an adaptive feedback loop. In doing so, the present technology can quickly and accurately perform power factor correction.

In embodiments, the high speed power factor correction may also be implemented in conjunction with an adaptive feedback loop. The adaptive feedback loop can be utilized to accurately measure the actual value of the overtone component contained within the signal. The control signal is then adapted to suppress the overtone component based on the actual measured value. During steady-state operation, the adaptive feedback loop can be used to maximally perform power factor correction. Upon detection of a significant change from the steady-state conditions of the signal, indicating a change in the load or other transient event, the adaptive feedback loop can be automatically disengaged. High speed power factor correction can then be performed based on an expected value of an overtone component induced by the transient event. As a result, maximal steady-state power factor correction can be achieved, while also quickly and accurately performing power factor correction in response to transient events.

The adaptive feedback loop may also be utilized to measure the residual or remaining value of the overtone component following application of the control signal intended to suppress the overtone component based on an expected value. The expected value of the overtone component stored in memory may then be updated based on the measured residual value. In doing so, robust high quality power factor correction can be provided which can adapt to component variation and aging.

Figure 1:
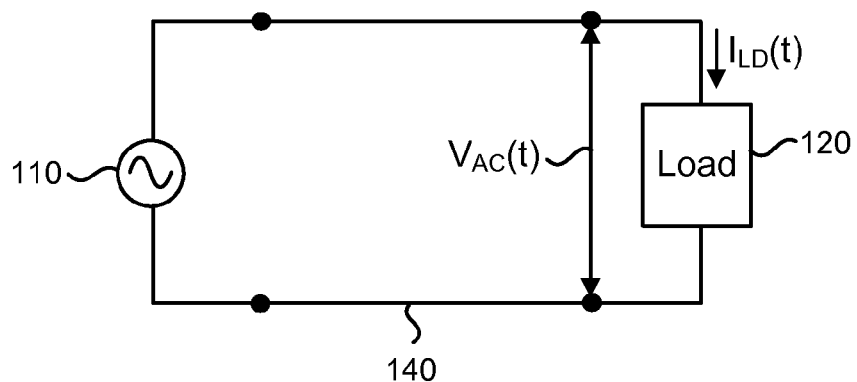
FIG. 1 illustrates a simplified diagram of a system for supplying AC power to a remote load.
Figure 2A:
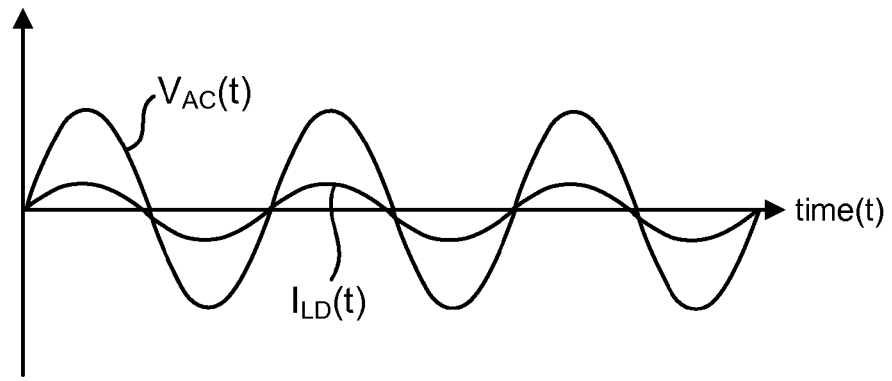
FIG. 2A illustrates example waveforms where supply voltage $V_{AC}(t)$ and the load current $I_{LD}(t)$ are directly proportional and change polarity at the same instant in time.
Figure 2B:
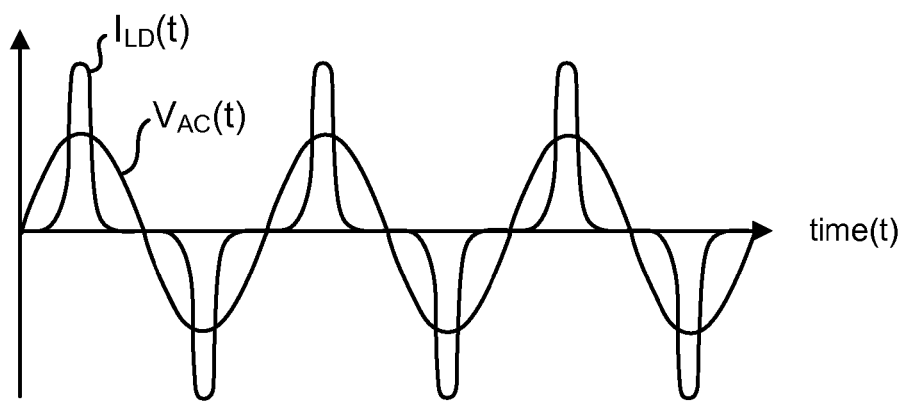
FIG. 2B illustrates example waveforms where the load current $I_{LD}(t)$ has a highly non-sinusoidal waveform.
Figure 3:
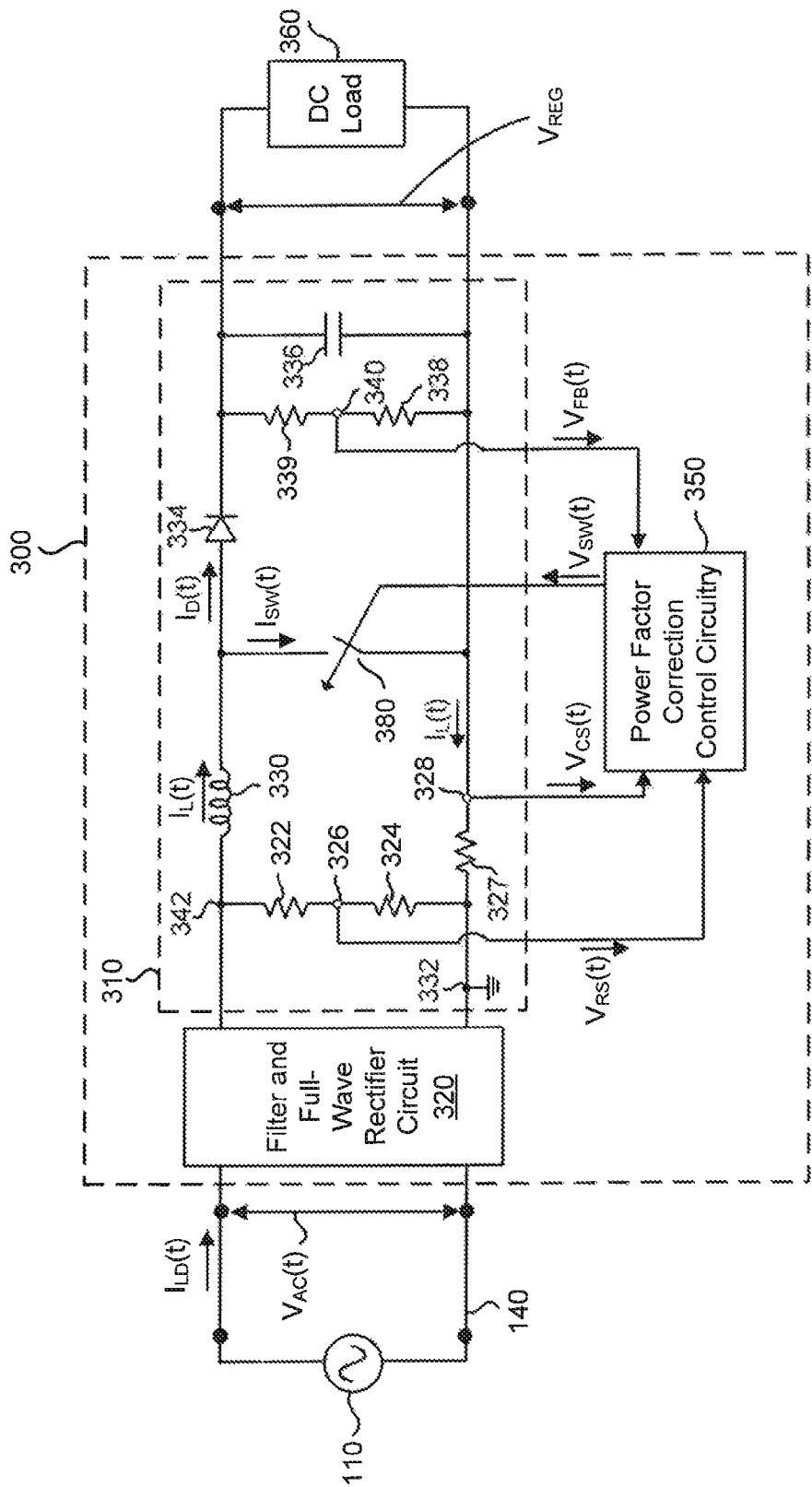
FIG. 3 is a block diagram of a regulated power supply circuit which can be used to perform high speed power factor correction as described herein.

FIG. 3 is a block diagram of a regulated power supply circuit 300 which can be used to perform high speed power factor correction as described herein. Power supply source 110 is coupled to the regulated power supply circuit 300 via a transmission line of a power distribution system 140. The power supply source 110 provides AC power by generating an AC supply voltage $V_{AC}(t)$ at a fundamental supply frequency $f_{AC}$ such as 60 Hertz. The supply voltage $V_{AC}(t)$ is delivered to the regulated power supply circuit 300 to induce a load current $I_{LD}(t)$, thereby delivering AC power to the regulated power supply circuit 300.

The regulated power supply circuit 300 converts the AC power provided by the power supply source 110 into DC power in the form of a regulated DC output voltage $V_{REG}$. The regulated power supply circuit 300 operates to maintain a nearly constant regulated DC output voltage $V_{REG}$ supplied to a DC load 360. The DC load 360 may consist of an electronic device such as a computer or household appliance which requires DC power to operate. In some embodiments, the DC load 360 may actually consist of an electronic device which requires AC power to operate. In such a case, the DC load 360 may include a DC-to-AC converter input stage for converting the DC power back to AC power.

As mentioned above, the conversion from AC-to-DC power typically includes non-linear elements such as diodes which may, in the absence of power factor correction, result in the load current $I_{LD}(t)$ having a highly non-sinusoidal waveform. The non-sinusoidal waveform results in the load current $I_{LD}(t)$ having overtone components $I_{LDm}(t)$, which in turn results in a power factor less than 1. Similarly, even if power factor correction is being performed, changes in the operating conditions or other transient events can temporarily distort the load current $I_{LD}(t)$ and result in overtones components $I_{LDm}(t)$. This in turn causes the power factor to temporarily decrease, consequently decreasing power consumption efficiency and increasing the stress on the power generation and distribution processes.

As described in more detail below, the regulated power supply circuit 300 performs high speed power factor correction which can overcome or substantially alleviate the problems associated with changes in the operating conditions of the DC load 360 or other transient events. Upon indication of a transient event or other change in the operating conditions, the regulated power supply circuit 300 can quickly and accurately adjust the load current $I_{LD}(t)$ to match the waveform of the supply voltage $V_{AC}(t)$. In doing so, the regulated power supply circuit 300 promptly removes or suppresses the overtone components $I_{LDm}(t)$ induced by the transient condition.

In the illustrated embodiment, the regulated power supply circuit 300 includes rectifier circuitry 320, regulator circuitry 310 and power factor correction control circuitry 350. As described below, the power factor correction control circuitry 350 provides a control signal $V_{SW}(t)$ to the regulator circuitry 310 to perform high speed power factor correction as described herein. The regulator circuitry 310 is responsive to the control signal $V_{SW}(t)$ to regulate the load current $I_{LD}(t)$ and promptly remove or suppress the overtone components $I_{LDm}(t)$ which may be present in the load current $I_{LD}(t)$.

As shown in FIG. 3, the rectifier circuitry 320 receives the supply voltage $V_{AC}(t)$ from the power supply source 110. In the illustrated embodiment, the rectifier circuitry 320 comprises of a low pass filter and a full-wave rectifier circuit. The low pass filter filters the supply voltage $V_{AC}(t)$ to remove high-frequency spikes and RF noise. The full-wave rectifier circuit performs full-wave rectification on the supply voltage $V_{AC}(t)$ to form a full-wave rectified voltage $V_{FWR}(t)$. In the illustrated embodiment, the full-wave rectifier circuit is a full-wave bridge rectifier which includes four diodes. In alternative embodiments, other circuits may be used to perform rectification of the supply voltage $V_{AC}(t)$. For example, the rectifier circuitry 320 may alternatively include a center-tap transformer and two diodes.

The full-wave rectified voltage $V_{FWR}(t)$ is provided to the regulator circuitry 310 between node 342 and node 332 connected to ground. The full-wave rectified voltage $V_{FWR}(t)$ is applied to inductor 330 to induce an inductor current $I_L(t)$ to flow between the rectifier circuit 320 and the regulator circuit 310. The inductor current $I_L(t)$ is thus a rectified form of the load current $I_{LD}(t)$ drawn by the regulated power supply circuit 300 from the power supply source 110. In other words, the waveform of the inductor current $I_L(t)$ indicates the waveform of the load current $I_{LD}(t)$. In addition, since the full-wave rectified voltage $V_{FWR}(t)$ is a rectified form of the supply voltage $V_{AC}(t)$, the waveform of the rectified voltage $V_{FWR}(t)$ indicates the waveform of the supply voltage $V_{AC}(t)$.

As a result, a difference between the waveforms of the full-wave rectified voltage $V_{FWR}(t)$ and the inductor current $I_L$ indicates a difference between the waveforms of the supply voltage $V_{AC}(t)$ and the load current $I_{LD}(t)$. In other words, if the inductor current $I_L(t)$ is not proportional to, and in phase with, the full-wave rectified voltage $V_{FWR}(t)$, the load current $I_{LD}(t)$ will be distorted and include overtone components $I_{LDm}(t)$. Thus, appropriately regulating the inductor current $I_L(t)$ to match the waveform of the full-wave rectified voltage $V_{FWR}(t)$ is equivalent to matching the load current $I_{LD}(t)$ to the waveform of the supply voltage $V_{AC}(t)$. As such, power factor correction can be performed to suppress or remove overtone components present in the load current $I_{LD}(t)$ by appropriately controlling the shape of the waveform of the inductor current $I_L(t)$.

The distortions in the wave form are caused by overtones in the rectified or AC load current which reduce the power factor from 1. By detecting and removing overtone components of the rectified circuit, the load current can be made proportional to the rectified input voltage, thus making the power factor essentially 1.

The regulator circuitry 310 regulates the shape of the inductor current $I_L(t)$ via a switch 380, which by extension performs power factor correction to suppress or remove overtones within the load current $I_{LD}(t)$. As shown in FIG. 3, the switch current $I_{SW}(t)$ is the difference between the inductor current $I_L(t)$ and a diode current $I_D(t)$ flowing through diode 334. In other words, for a given diode current $I_D(t)$, regulating the shape of the switch current $I_{SW}(t)$ enables the regulation of the inductor current $I_L(t)$, which in turn regulates the load current $I_{LD}(t)$.

The switch 380 is responsive to a control signal $V_{SW}(t)$ to draw a switch current $I_{SW}(t)$, thereby regulating the shape of waveform of the inductor current $I_L(t)$. The characteristics of the control signal $V_{SW}(t)$ are described in more detail below.

The diode 334 and capacitor 336 filter out the ripple within the full-wave rectified voltage $V_{FWR}(t)$ to produce a nearly constant regulated DC output voltage $V_{REG}$ to the DC load 360. The operation of the rectifier circuitry 320 is discussed in more detail in U.S. Pat. No. 7,719,862, the disclosure of which was previously incorporated by reference.

The control signal $V_{SW}(t)$ is a sequence of pulses at a pulse frequency $f_p$ much greater than the fundamental supply frequency $f_{AC}$. For example, the pulse frequency $f_p$ may be 100 to 10,000 times greater than the fundamental supply frequency $f_{AC}$. As a result, the switch 380 turns on and off may times during each wave of the rectified voltage $V_{FWR}(t)$. Switch current $I_{SW}(t)$ flows through switch 380 in response to each pulse of the control signal $V_{SW}(t)$ and drops rapidly to zero at the end of each pulse. The pulse widths of the pulses of the control signal $V_{SW}(t)$ are adapted to cause the waveform of the inductor current $I_L(t)$ to match the shape full-wave rectified voltage $V_{FWR}(t)$. In doing so, the pulse widths of the pulses of the control signal $V_{SW}(t)$ are adapted to perform power factor correction. The formation of the control signal $V_{SW}(t)$ is discussed in more detail below.

The power factor correction control circuitry 350 receives sample voltage signals of operating conditions within the regulator circuitry 310. As described below, these operating conditions indicate of the state of the load current $I_{LD}(t)$, and are used to quickly and accurately determine when an overtone component is present within the load current $I_{LD}(t)$. The power factor correction control circuitry 350 then retrieves an expected value of the overtone component from memory based on the sensed state of the load current $I_{LD}(t)$ as indicated by the operating conditions within the regulator circuitry 310. Appropriate adjustments are then made to the pulse widths of the control signal $V_{SW}(t)$ to modify the waveform of the inductor current $I_L(t)$ based on the expected value. By extension, the control signal $V_{SW}(t)$ thus suppresses the overtone component in the load current $I_{LD}(t)$ and performs power factor correction. The power factor correction control circuitry 350 may include a processor executing instructions stored in the memory to perform functionality described herein, including high speed power factor correction.

In the illustrated embodiment, the power factor correction control circuitry 350 senses the state of the load current $I_{LD}(t)$ to determine the presence of an overtone component $I_{LDm}(t)$ based on sample voltage signals $V_{RS}$, $V_{CS}$ and $V_{FB}$. Sample voltage signal $V_{RS}$ is the voltage at sensing node 326 of an input voltage divider network formed by resistor 322 and resistor 324. The current flowing through the voltage divider 322/324 depends on the rectified voltage $V_{FWR}(t)$, which in turn depends on the supply voltage $V_{AC}(t)$. As a result, the sample voltage $V_{RS}$ is indicative of the supply voltage $V_{AC}(t)$.

Sample voltage signal $V_{FB}$ is the voltage at sensing node 340 of an output voltage divider network formed by resistor 338 and resistor 339. The current flowing through the voltage divider 338/339 depends on the regulated voltage $V_{REG}$. As a result, the sample voltage $V_{FB}$ is indicative of the regulated voltage $V_{REG}$.

As shown in FIG. 3, the diode current $I_L(t)$ flowing through current-sense resistor 327 creates the sample voltage signal $V_{CS}$ at sensing node 328. As a result, the sample voltage signal $V_{CS}$ is indicative of the diode current $I_L(t)$ and thus by extension is indicative of the load current $I_{LD}(t)$.

When a change in the operating conditions of the DC load 360 or other transient event occurs, these sample voltage signals $V_{RS}$, $V_{CS}$ and $V_{FB}$ will begin to change, thereby indicating a change in the load current $I_{LD}(t)$ and thus the presence of an overtone component $I_{LDm}(t)$. In response, the power factor correction control circuitry 350 then performs high speed power factor correction as described herein. The power factor correction control circuitry 350 is described in more detail below with reference to FIGS. 6 to 13.

Figure 4:
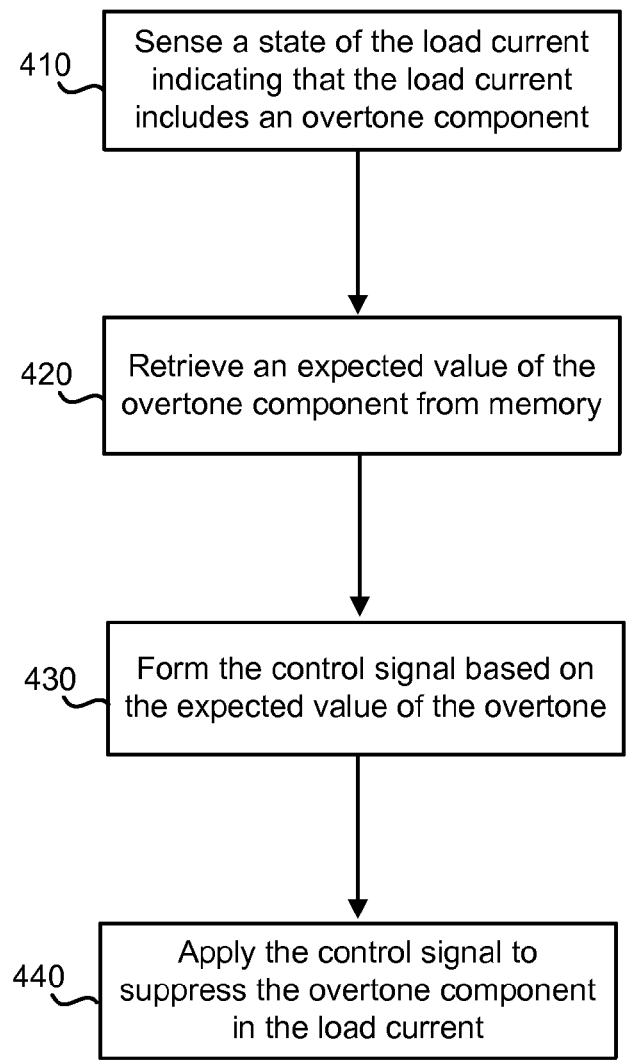
FIG. 4 is a flow chart of an exemplary method for performing power factor correction on a signal having a fundamental supply frequency.

FIG. 4 is a flow chart of an exemplary method 400 for performing power factor correction on a signal having a fundamental supply frequency. As with all flow charts herein, in some embodiments steps may be combined, performed in parallel, or performed in a different order, and may include additional or fewer steps than those illustrated.

In step 410, the power factor correction control circuitry 350 senses the state of the load current $I_{LD}(t)$ based on operating conditions as indicated by one or more of the sample voltage signals $V_{RS}$, $V_{CS}$ and $V_{FB}$. The sensed state predicts the existence of overtones in the circuit and a reduction of the power factor. The amplitudes of the predicted components, $I_{LDm}(t)$, may range from zero to an appreciable fraction of the fundamental frequency of the load current. There will always be a predicted value of overtone components, $I_{LDm}(t)$ ranging from zero to some larger value.

In step 420, the power factor correction control circuitry 350 retrieves an expected value of the overtone components $I_{LDm}(t)$ from memory. In step 430, the control signal $V_{SW}(t)$ is formed based on the expected value of the overtone component $I_{LDm}(t)$. In step 440, the control signal $V_{SW}(t)$ is applied to suppress the overtone component $I_{LDm}(t)$ in the load current $I_{LD}(t)$. This suppression is an open loop action based on the expected overtone values observed either by past measurements or by calculation. In other words, the values of overtones are not sensed in real time.

In the description above, power factor correction was described in the context of suppressing a single overtone component. More generally, the techniques described herein can be utilized to suppress a one or more overtone components, such as 3, 4, 7 or more.

Figure 5:
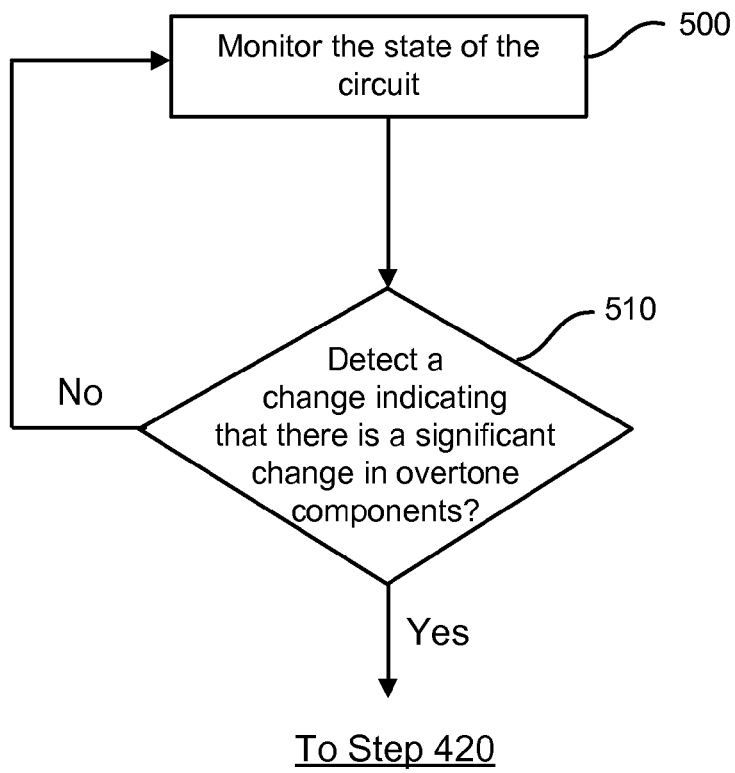
FIG. 5 is a flow chart of an exemplary operation for sensing the state of the signal in the flow chart in FIG. 4.

FIG. 5 is a flow chart of an exemplary operation for sensing the state of the load current $I_{LD}(t)$ in step 410 of the method of FIG. 4. In step 500, the state of the load current $I_{LD}(t)$ is monitored by monitoring the circuit based on one or more of the sample voltage signals $V_{RS}$, $V_{CS}$ and $V_{FB}$. At step 510, it is determined whether a significant change has been detected in the state of the load current $I_{LD}(t)$ indicating a significant change in overtone components $I_{LDm}(t)$. In this example, this can be accomplished by monitoring the change in one or more of the sample voltage signals $V_{RS}$, $V_{CS}$ and $V_{FB}$.

The indication of the presence of overtone components $I_{LDm}(t)$ may also or alternatively be based on other operating conditions, such as the temperature of a node carrying the load current $I_{LD}(t)$ or a current based thereon. It will be understood that the detection of a transient event indicating a change of overtone components $I_{LDm}(t)$ may occur some time after the beginning of the transient event. So long as a significant change has not been detected which indicates a significant change in overtone components $I_{LDm}(t)$, the operation remains in the loop and the state of the load current $I_{LD}(t)$ continues to be monitored through the signals $V_{RS}$, $V_{CS}$ and $V_{FB}$. Upon detection of a change indicating a change in the predicted overtone components $I_{LDm}(t)$, the operation continues to step 420.

Figure 6:
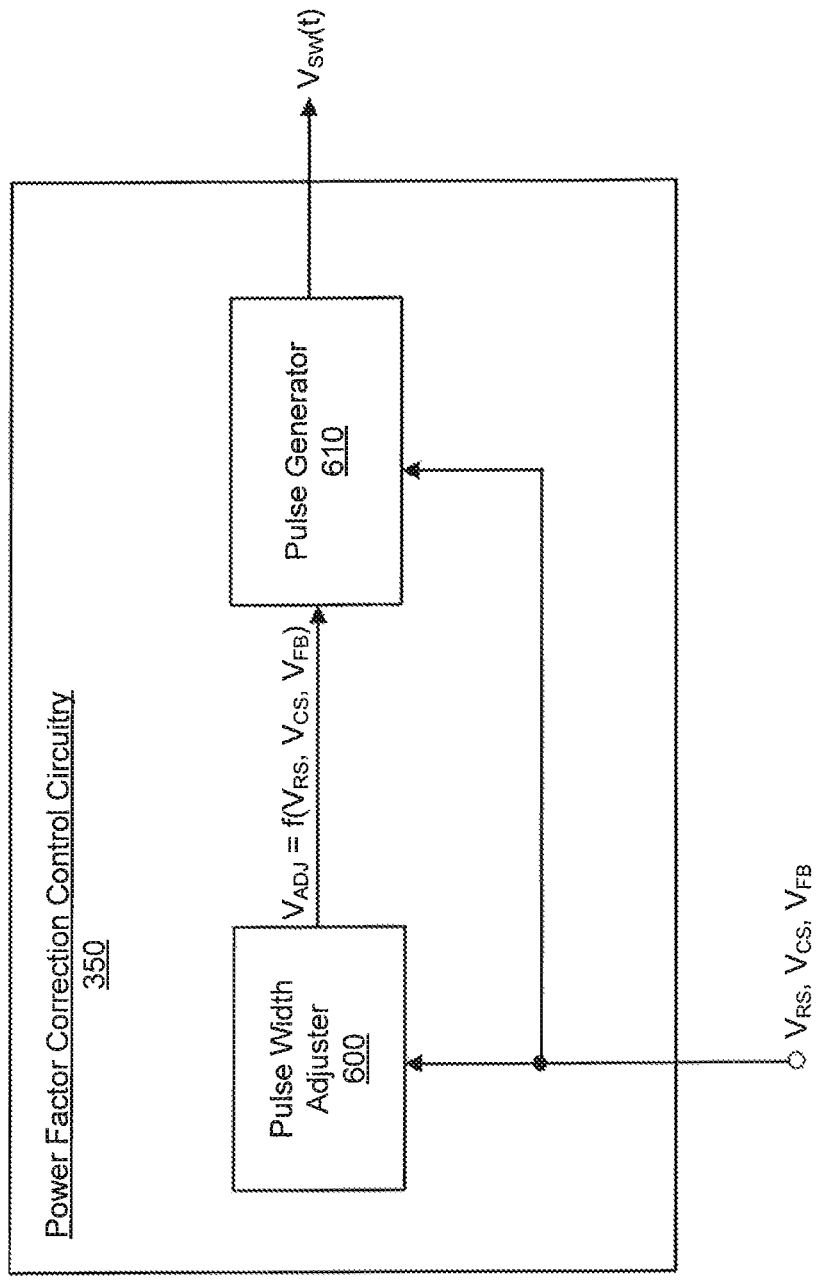
FIG. 6 is an exemplary block diagram of the power factor control circuitry.

FIG. 6 is an exemplary block diagram of the power factor correction control circuitry 350. The power factor correction control circuitry 350 includes pulse width adjustor 600 and pulse generator 610. The power factor correction control circuitry 350 may include more or fewer components than those illustrated in FIG. 6, and the functionality of the circuitry may be combined or expanded into fewer or additional blocks.

The pulse width adjustor 600 receives the sample voltage signals $V_{RS}$, $V_{CS}$ and $V_{FB}$. As described in more detail below, the pulse width adjustor 600 determines an expected value of an overtone component $I_{LDm}(t)$ based on one or more of the sample voltage signals $V_{RS}$, $V_{CS}$ and $V_{FB}$. The pulse width adjustor circuitry 600 then forms an adjustment signal $V_{ADJ}$ based on the expected value of an overtone component $I_{LDm}(t)$. The adjustment signal $V_{ADJ}$ is configured such that the pulse generator 610 is responsive to the adjustment signal $V_{ADJ}$ to adjust the pulse width of the control signal $V_{SW}(t)$ to perform power factor correction as described herein. The pulse width adjustor circuitry 600 may be as described in more detail below with respect to various embodiments shown in FIGS. 7 and 10 to 13.

The pulse generator circuitry 610 receives the sample voltage signals $V_{RS}$, $V_{CS}$ and $V_{FB}$ and the adjustment signal $V_{ADJ}$ to form the control signal $V_{SW}(t)$. The control signal $V_{SW}(t)$ is then provided to the switch 380 in the regulator circuitry 310 to perform power factor correction as described herein. The pulse generator circuitry 610 is described in more detail below with respect to FIG. 8.

Figure 7:
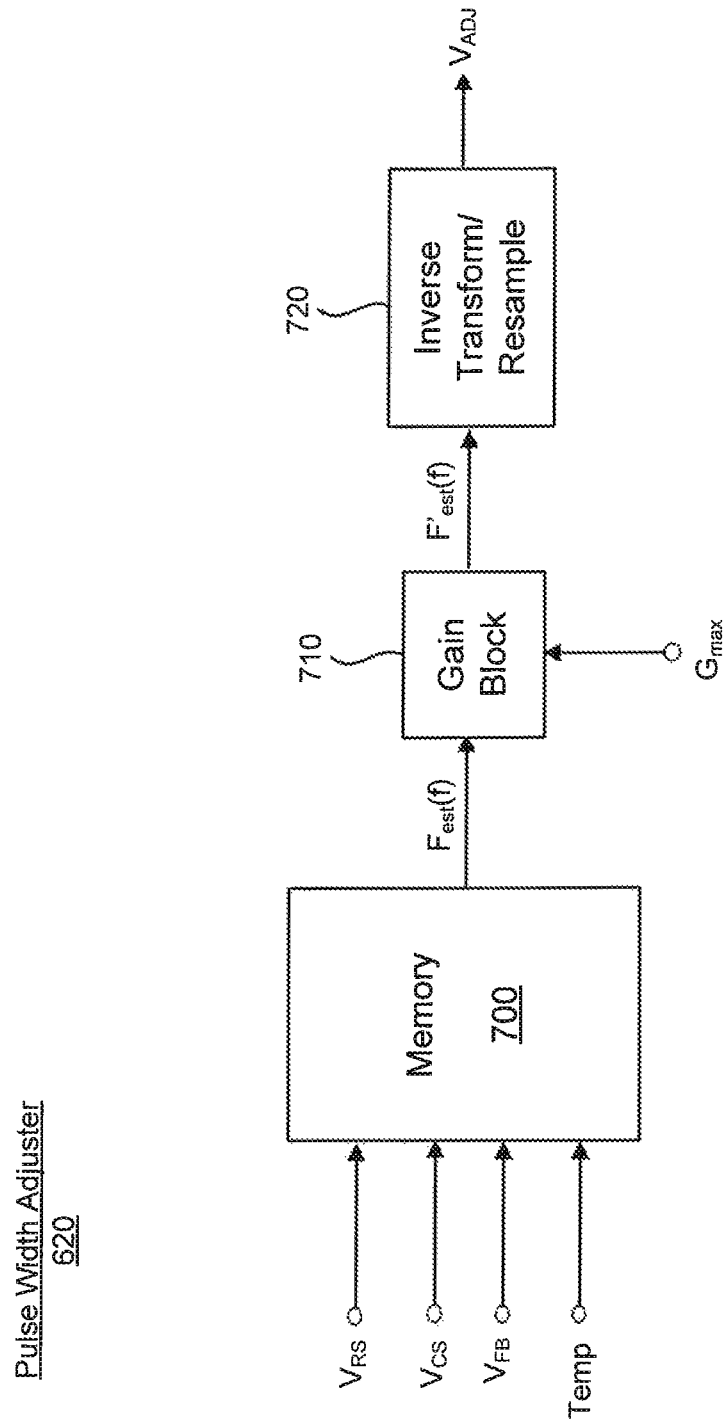
FIG. 7 is a first block diagram of an exemplary pulse width adjustor.

FIG. 7 is a first block diagram of an exemplary pulse width adjustor and is identified as 620. In the embodiment illustrated in FIG. 7, the pulse width adjustor 620 includes memory 700, gain block 710, and inverse transform/resample block 720.

The memory 700 receives the sample voltage signals $V_{RS}$, $V_{CS}$ and $V_{FB}$. In the illustrated embodiment, the memory 700 also receives a signal Temp indicating the temperature within the regulated power supply circuit 300. The signal Temp may be generated using a temperature sensor.

The memory 700 outputs a set of one or more expected overtone values $I_{estm}$ based on the sample voltage signals $V_{RS}$, $V_{CS}$ and $V_{FB}$ and the temperature. In the illustrated embodiment, the memory 700 outputs the estimated overtone value(s) in the form of a frequency domain representation given by frequency domain coefficients $F_{est}(f)$. The values of the frequency domain coefficients $F_{est}(f)$ as a function of the sample voltage signals $V_{RS}$, $V_{CS}$ and $V_{FB}$ and temperature may for example be determined empirically based on measured overtone values. The values of the frequency domain coefficients $F_{est}(f)$ may for example be stored in the form of a look-up table in the memory 700. Interpolation may then be used to determine the values of the frequency domain coefficients $F_{est}(f)$ for conditions in between the entries in the look-up table. Alternatively the data can be stored in the time domain such that the inverse transform/resample block 720 can be removed. In such a case, the computation complexity is lessened although a much larger memory is required for storing the time domain data. This is described in more detail below with respect to FIG. 12.

The frequency domain coefficients $F_{est}(f)$ are provided to the gain block 710. The gain block 710 applies a gain value $G_{max}$ to form weighted frequency domain coefficients $F'_{est}(f)$. In alternative embodiments, the arrangement the gain block 710 within the closed loop provided by the overtone removal system may be different than that shown in FIG. 7. For example, in one alternative embodiment the gain block 710 is placed after the inverse transform/resample block 720.

The inverse transform/resample block 720 receives the weighted frequency domain coefficients $F'_{est}(f)$. The inverse transform/resample block 720 performs an inverse transform on the weighted frequency domain coefficients $F'_{est}(f)$. The result of the inverse transform is then resampled to the switching frequency $f_p$ to form the adjustment signal $V_{ADJ}$ in the time-domain.

Figure 8:
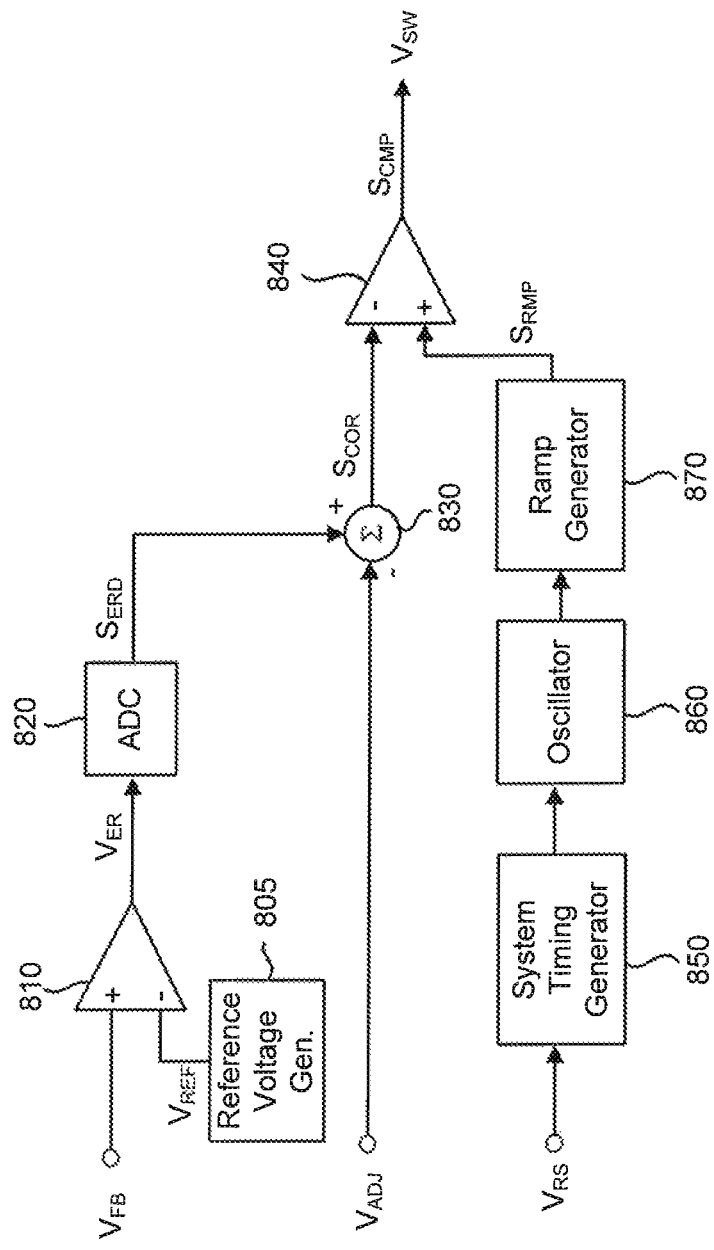
FIG. 8 is a block diagram of an exemplary pulse generator.

FIG. 8 is a block diagram of an exemplary pulse generator 610. The pulse generator 610 may include more or fewer components than those illustrated in FIG. 8, and the functionality of the circuitry may be combined or expanded into fewer or additional blocks.

The pulse generator 610 includes comparator 810. The comparator 810 receives the sample voltage signal $V_{FB}$ at a first input, and receives a reference voltage $V_{REF}$ provided by reference voltage generator 805 at a second input. As described above, the sample voltage signal $V_{FB}$ indicates the regulated DC output voltage $V_{REG}$ output by the regulated power supply circuit 300. The comparator 810 compare the signals at its inputs to produce an error voltage signal $V_{ER}$ indicative of how much the regulated DC output voltage $V_{REG}$ differs from a desired target value. Analog-to-digital converter (ADC) 820 digitizes the error voltage signal $V_{ER}$ to form digital error signal $S_{ERD}$. Summer 830 then subtracts the adjustment signal $V_{ADJ}$ from digital error signal $S_{ERD}$ to produce correction signal $S_{COR}$.

The pulse generator 610 also includes a system timing generator 850 which receives the sample voltage signal $V_{RS}$. The system timing generator 850 provides oscillator 860 with an oscillator control signal that controls the oscillation frequency of the oscillator 860. The oscillator 860 then provides the oscillation frequency to the ramp generator 870. The ramp generator 870 uses the oscillation frequency to generate a digital voltage ramp in the form of a ramp signal $S_{RMP}$.

Comparator 840 compares the correction signal $S_{COR}$ with the ramp signal $S_{RMP}$ to generate a comparison signal $S_{CMP}$. The comparison signal $S_{CMP}$ is then output as the control signal $V_{SW}$. The operation of the pulse generator 610 is discussed in more detail in U.S. Pat. No. 7,719,862, the disclosure of which was previously incorporated by reference.

Figure 9:
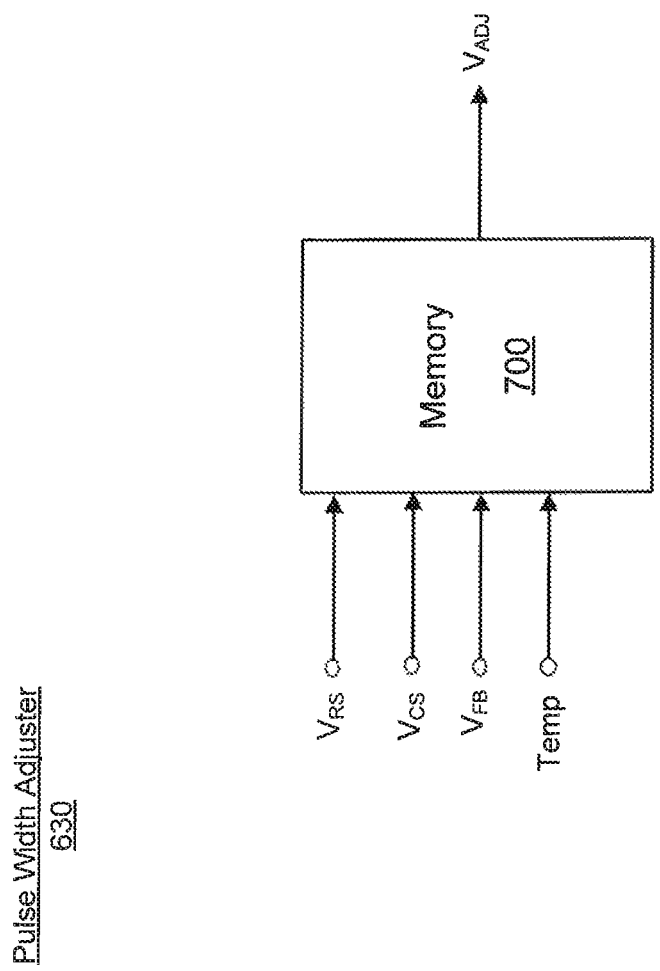
FIG. 9 illustrates a second block diagram of an exemplary pulse width adjustor.

FIG. 9 illustrates a second block diagram of an exemplary pulse width adjustor and is identified as 630. In the embodiment illustrated in FIG. 9, memory 700 stores the inverse transform of the frequency domain coefficients $F_{est}(f)$ which were stored in the embodiment illustrated in FIG. 7. As a result, the memory 700 directly outputs the adjustment signal $V_{ADJ}$ in the time-domain.

Figure 10A:
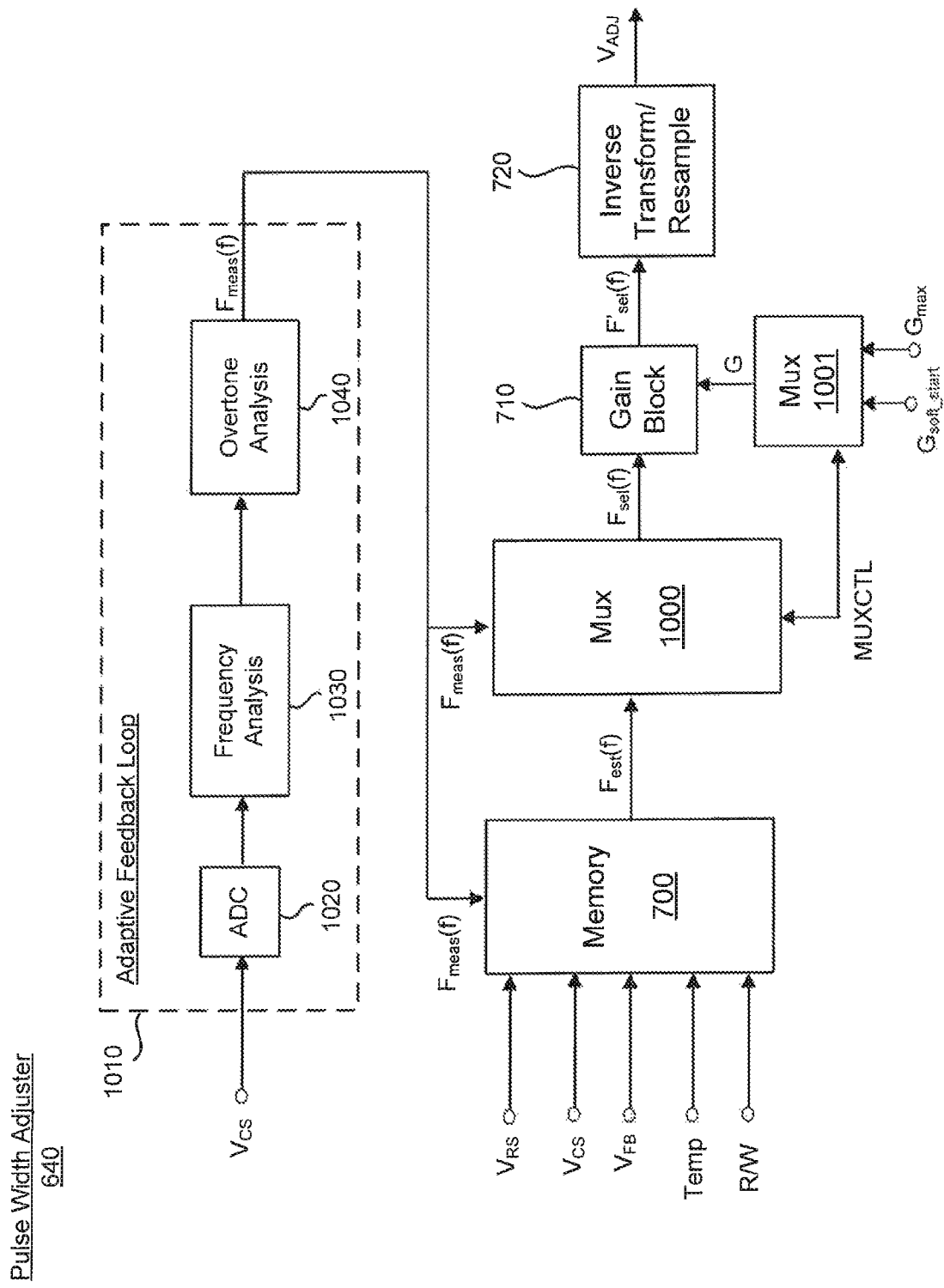
FIG. 10A illustrates a third block diagram of an exemplary pulse width adjustor.

FIG. 10A illustrates a third block diagram of an exemplary pulse width adjuster and is identified as 640. In FIG. 10A, the pulse width adjuster 640 includes an adaptive feedback loop 1010 for measuring the actual values of the overtone components in the load current $I_{LD}(t)$.

The adaptive feedback loop 1010 receives the sample voltage signal $V_{CS}$. As described above, the sample voltage signal $V_{CS}$ indicates the load current $I_{LD}(t)$. Thus, by analyzing the frequency content of the sample voltage signal $V_{CS}$, the actual values of the overtone components within the load current $I_{LD}(t)$ can be determined. Analog-to-digital converter (ADC) 1020 digitizes the sample voltage signal $V_{CS}$ and provides the result to frequency analysis 1030. The frequency analysis 1030 performs frequency domain analysis to transform the digitized sample voltage signal $V_{CS}$ into a frequency domain representation. The frequency domain analysis performed may for example be a fast Fourier transform (FFT). The frequency domain analysis determines the frequencies present in the sample voltage signal $V_{CS}$ and the corresponding frequency domain values.

The frequency domain representation of the digitized sample voltage signal $V_{CS}$ is provided to overtone analysis 1040. The overtone analysis 1040 determines the actual value(s) of the overtones components in the form of a frequency domain representation given by actual frequency domain coefficients $F_{meas}(f)$ The operation of the adaptive feedback loop 1010 is discussed in more detail in U.S. Pat. No. 7,719,862, the disclosure of which was previously incorporated by reference.

The actual frequency domain coefficients $F_{meas}(f)$ are provided to a multiplexer (MUX) 1000. The multiplexer 1000 also receives the estimated frequency domain coefficients $F_{est}(f)$ from memory 700. The multiplexer 1000 also receives a control signal MUXCTL generated with the power factor correction control circuitry 350. The multiplexer 1000 is responsive to the control signal MUXCTL to select either the estimated frequency domain coefficients $F_{est}(f)$ or the actual frequency domain coefficients $F_{meas}(f)$ for use in subsequently forming the adjustment signal $V_{ADJ}$.

For example, during steady-state operation, the multiplexer 1000 may select actual frequency domain coefficients $F_{meas}(f)$ In doing so, the adaptive feedback loop 1010 can be used to maximally perform power factor correction. Upon detection of a significant change from the steady-state conditions, indicating a change in the DC load 360 or other transient event, the control signal MUXCTL change states such that the adaptive feedback loop 1010 can be automatically disengaged. In such a case, high speed power factor correction is performed using the estimated frequency domain coefficients $F_{est}(f)$ provided from memory 700. As a result, maximal steady-state power factor correction can be achieved, while also quickly and accurately performing power factor correction in response to transient events.

The gain block 710 in FIG. 10A is used to drive the detected overtones in the adaptive loop to a minimal amount, reducing the measured overtones by a factor of $1/(1+G)$, where G is the loop gain of the adaptive loop. The gain block 710 may be placed anywhere within the adaptive loop. The value of G is selected via multiplexer 1001 to provide optimal loop stability and overtone removal. During startup G may have a soft start function $G_{soft\_start}$ starting from near zero and rising slowly to its final value, $G_{max}$. This allows the loop to settle without the upset of a step response to the start conditions.

Figure 10B:
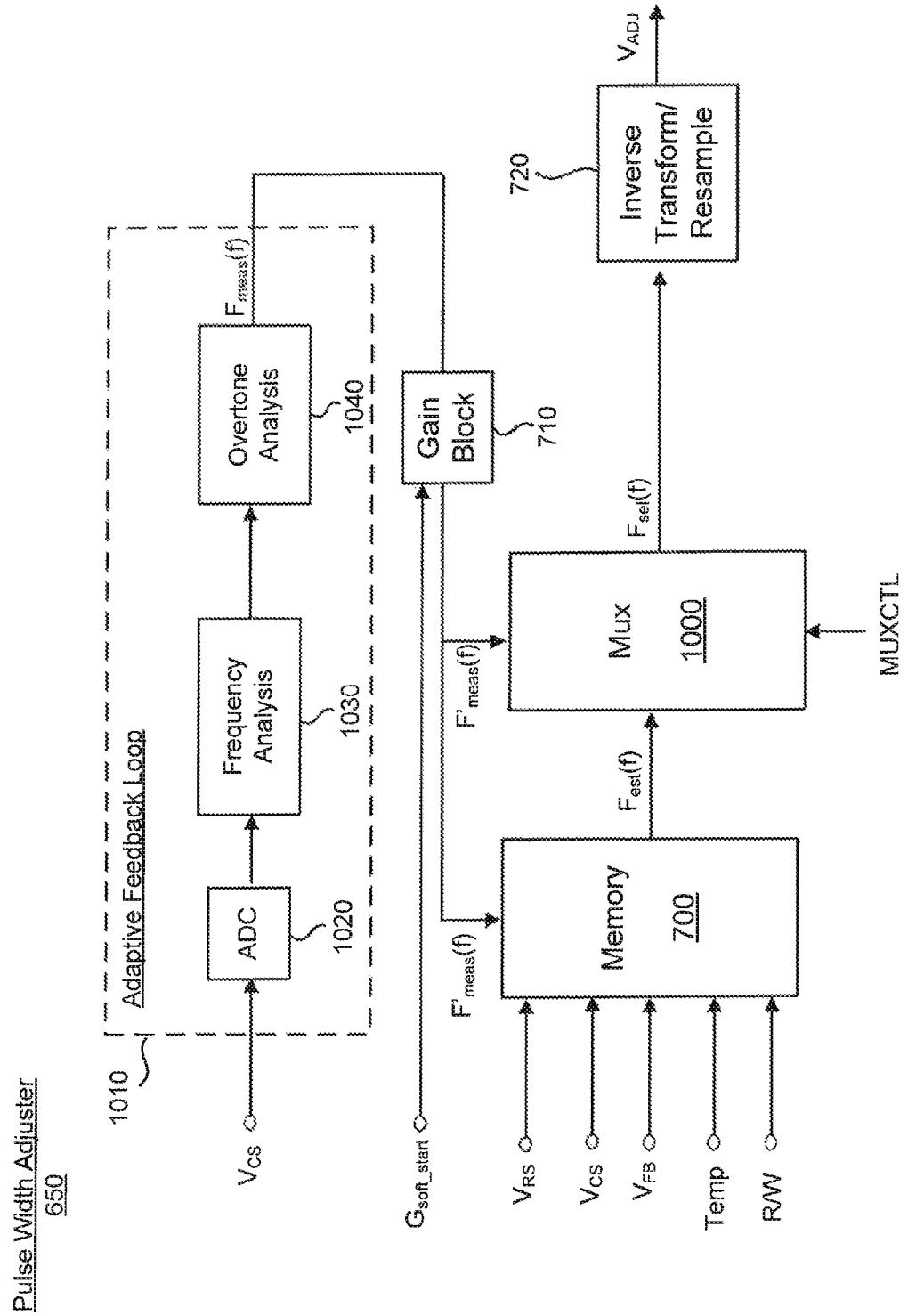
FIG. 10B illustrates a fourth block diagram of an exemplary pulse with adjustor.

When the gain block 710 is used with the memory 700, the memory 700 contains the residual error components of the overtones and $G_{max}$ is the maximum loop gain. If there is no adaptive loop working in real time, the loop gain may be incorporated in the memory function, itself. This is shown in FIG. 10B and is identified as pulse width adjuster 650.

For example, a CPU can be turned on and draw significant power and then turn off drawing a small power. The CPU can make these transitions with substantial frequency such that the adaptive loop would be in a constant state of hunting and thus be always non-adaptive. The use of the memory function will keep the power factor close to unity while the adaptive loop may take substantial time to respond to each step. The adaptive loop could take tens of milliseconds to respond to each step.

The multiplexer 1000 outputs the selected frequency domain coefficients $F_{sel}(f)$ to gain block 710. Similar to the discussion above, the gain block 710 applies a gain G to form weighted frequency domain coefficients $F'_{sel}(f)$. The inverse transform/resample block 720 receives the weighted frequency domain coefficients $F'_{sel}(f)$. The inverse transform/resample block 720 performs an inverse transform on the weighted frequency domain coefficients $F'_{sel}(f)$. The result of the inverse transform is then resampled to the switching frequency $f_p$ to form the adjustment signal $V_{ADJ}$ in the time-domain.

As shown in FIG. 10A, the actual frequency domain coefficients $F_{meas}(f)$ are also supplied to memory 700. These actual frequency domain coefficients $F_{meas}(f)$ can be utilized to update the estimated frequency domain coefficients $F_{est}(f)$ from time to time. The memory 700 is responsive to read/write control signal R/W to update the estimated frequency domain coefficients $F_{est}(f)$. For example, in steady-state conditions the adaptive feedback loop 1010 may be utilized to measure the residual or remaining value of the overtone component following application of the control signal $V_{SW}$ based on an expected values stored in memory 700. The expected value may then be updated based on the measured residual value. In doing so, robust high quality power factor correction can be provided which can adapt to component variation and aging.

Figure 11:
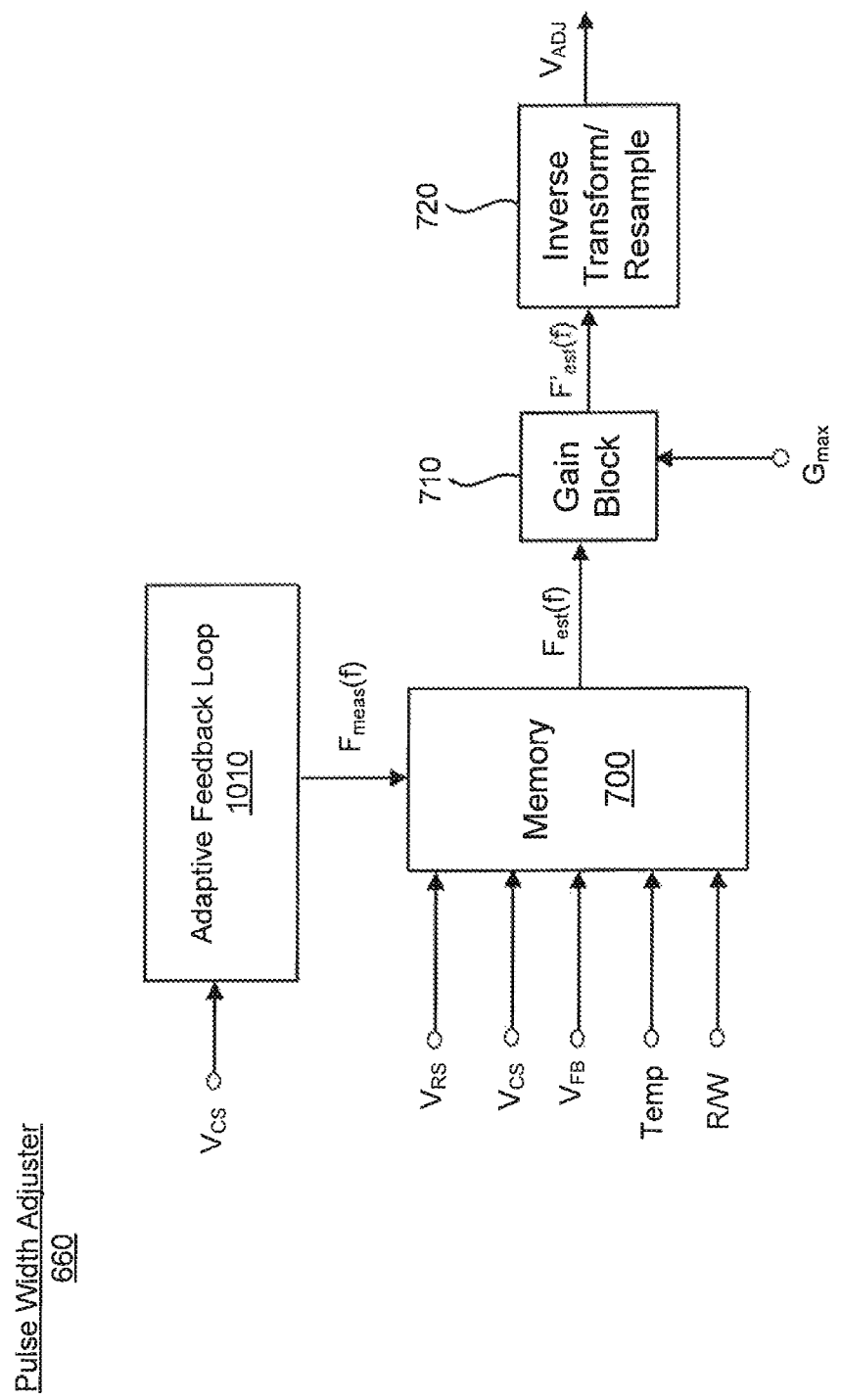
FIG. 11 illustrates a fifth block diagram of an exemplary pulse width adjustor.

FIG. 11 illustrates a fifth block diagram of an exemplary pulse width adjuster and is identified as 660. In FIG. 11, the multiplexer 1000 is removed from the embodiment illustrated in FIG. 10. As can be seen, the actual frequency domain coefficients $F_{meas}(f)$ output by the adaptive feedback loop 1010 are only supplied to memory 700.

Figure 12:
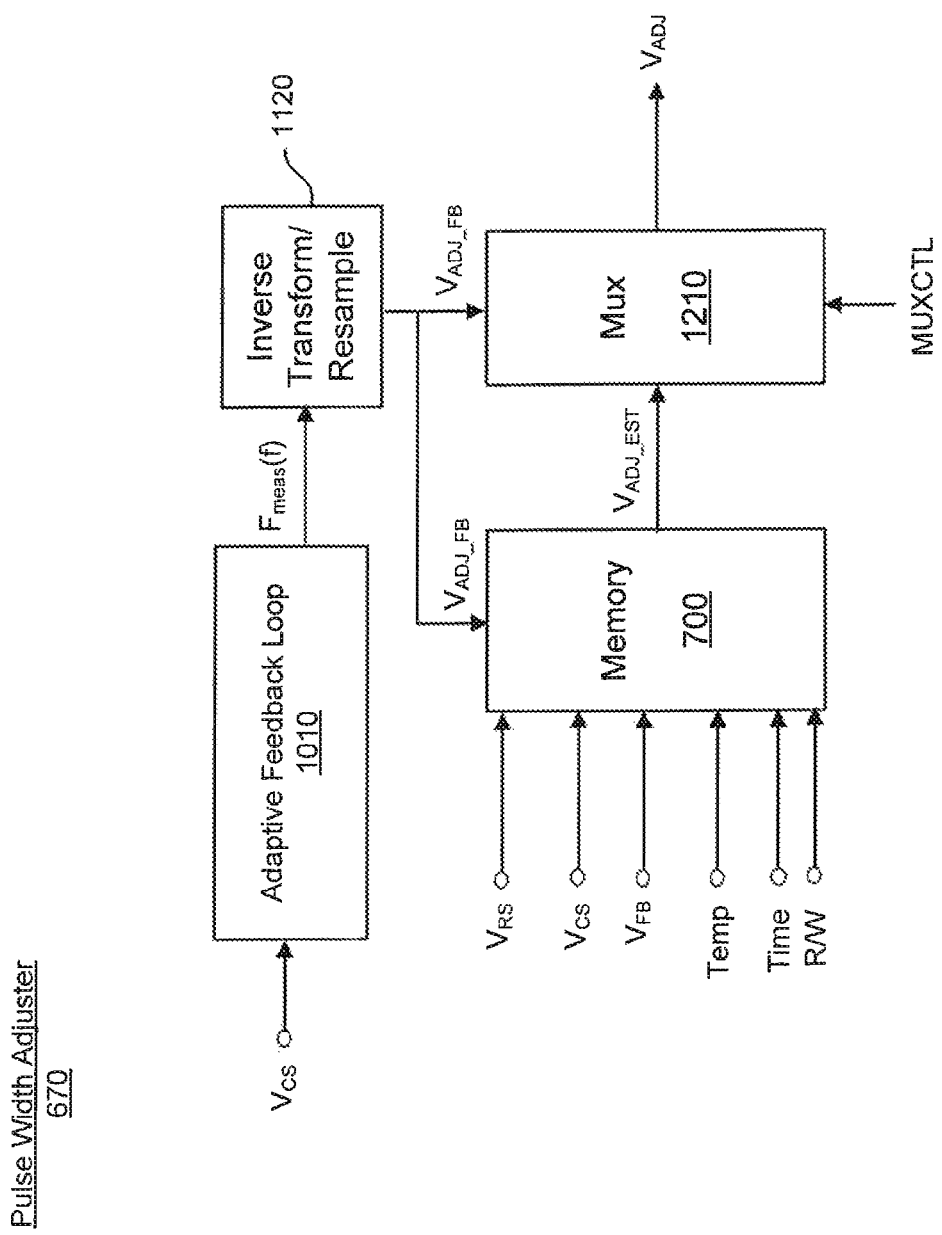
FIG. 12 illustrates a sixth block diagram of an exemplary pulse width adjustor.

FIG. 12 illustrates a sixth block diagram of an exemplary pulse width adjuster and is identified as 670. In FIG. 12, the actual frequency domain coefficients $F_{meas}(f)$ output by the adaptive feedback loop 1010 are provided to inverse transform/resample block 1120.

The inverse transform/resample block 1120 performs an inverse transform on the actual frequency domain coefficients $F_{meas}(f)$. The result of the inverse transform is then resampled to the switching frequency to form a feedback adjustment signal $V_{ADJ\_FB}$ in the time-domain. The feedback adjustment signal $V_{ADJ\_FB}$ is provided to multiplexer (MUX) 1210.

Similar to the discussion with respect to FIG. 9, in FIG. 12 the memory 700 stores the inverse transform of the estimated frequency domain coefficients $F_{est}(f)$. As a result, the memory 700 directly outputs an estimated adjustment signal $V_{ADJ\_EST}$ in the time-domain to the multiplexer 1210. The multiplexer 1210 is responsive to the control signal MUXCTL to select either the estimated adjustment signal $V_{ADJ\_EST}$ or the feedback adjustment signal $V_{ADJ\_FB}$ as the adjustment signal $V_{ADJ}$.

The feedback adjustment signal $V_{ADJ\_FB}$ is also provided to the memory 700. Similar to the discussion above, feedback adjustment signal $V_{ADJ\_FB}$ can be utilized to update the estimated adjustment signal $V_{ADJ\_EST}$ from time to time.

Figure 13:
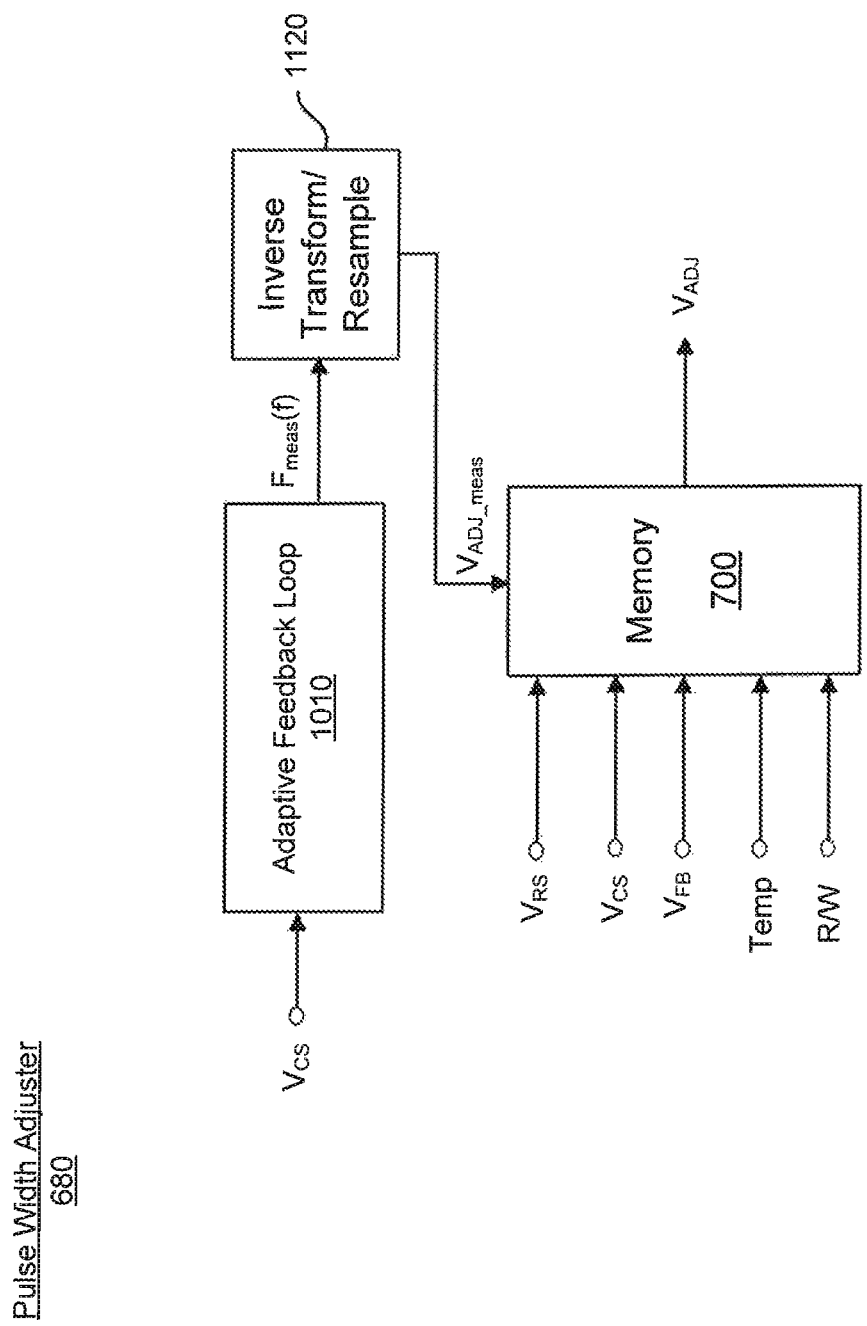
FIG. 13 illustrates a seventh block diagram of an exemplary pulse width adjustor.

FIG. 13 illustrates a seventh block diagram of an exemplary pulse width adjuster and is identified as 680. In FIG. 13, the multiplexer 1210 is removed from the embodiment illustrated in FIG. 12. As can be seen, in FIG. 13 the feedback adjustment signal $V_{ADJ\_FB}$ is only supplied to memory 700.

As used herein, a given signal, event or value is "based on" a predecessor signal, event or value if the predecessor signal, event or value influenced the given signal, event or value. If there is an intervening processing element, step or time period, the given signal can still be "based on" the predecessor signal, event or value. If the intervening processing element or step combines more than one signal, event or value, the output of the processing element or step is considered to be "based on" each of the signal, event or value inputs. If the given signal, event or value is the same as the predecessor signal, event or value, this is merely a degenerate case in which the given signal, event or value is still considered to be "based on" the predecessor signal, event or value. "Dependency" on a given signal, event or value upon another signal, event or value is defined similarly.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for performing power factor correction on a signal having a fundamental supply frequency, the method comprising:
   sensing a state of the signal, the state indicating that the signal includes overtone components of the fundamental supply frequency;
   retrieving an expected value of the overtone components from memory, the expected value based on the sensed state of the signal;
   forming a control signal based on the expected value of the overtone components; and
   applying the control signal to suppress the overtone components in the signal.

2. The method of claim 1, wherein sensing the state of the signal comprises monitoring the signal to detect a change in the state of the signal, the change indicating that the signal includes the overtone components, and further comprising retrieving the expected value of the overtone components upon the detection of the change in the state.

3. The method of claim 1, further comprising measuring a residual value of the overtone component upon applying the control signal and updating the expected value of the overtone components stored in memory based on the measured residual value.

4. The method of claim 1, wherein the expected value of the overtone components is based on at least one of a current and a voltage of the signal.

5. The method of claim 4, wherein the expected value of the overtone components is further based on a temperature of a node conducting the signal.

6. The method of claim 1, further comprising:
   measuring an actual value of the overtone components in the signal;
   forming a second control signal based on the actual value of the overtone components; and
   selecting between applying the control signal and applying the second control signal to suppress the overtone components in the signal.

7. A circuit for performing power factor correction on a signal having a fundamental supply frequency, the circuit comprising:
   a memory storing an expected value of overtone components of the fundamental supply frequency in the signal; and
   control circuitry to:
      sense a state of the signal, the state indicating that the signal includes the overtone components,
      retrieve the expected value of the overtone components from memory based on the sensed state of the signal,
      form a control signal based on the expected value of the overtone components, and
      apply the control signal to suppress the overtone components in the signal.

8. The circuit of claim 7, wherein the control circuitry:
   detects a change in the state of the signal, the change indicating that the signal includes the overtone components, and
   retrieves the expected value of the overtone components upon the detection of the change in the state.

9. The circuit of claim 7, wherein the control circuitry further:
   measures a residual value of the overtone components upon applying the control signal; and
   updates the expected value of the overtone components stored in memory based on the measured residual value.

10. The circuit of claim 7, wherein the expected value of the overtone components is based on at least one of a current and a voltage of the signal.

11. The circuit of claim 10, wherein the expected value of the overtone components is further based on a temperature of a node conducting the signal.

12. The circuit of claim 7, wherein the control circuitry further:
   measures an actual value of the overtone components in the signal;

forms a second control signal based on the actual value of the overtone components; and selects between applying the control signal and applying the second control signal to suppress the overtone components in the signal.

* * * * *